US011201949B2

(12) United States Patent
Poulikakos et al.

(10) Patent No.: US 11,201,949 B2
(45) Date of Patent: Dec. 14, 2021

(54) COMPUTER IMPLEMENTED METHOD AND COMPUTER DEVICE

(71) Applicant: KING.COM LIMITED, St. Julians (MT)

(72) Inventors: Alexander Poulikakos, Stockholm (SE); Alexander Andelkovic, Stockholm (SE); Jonathan Beck, Stockholm (SE)

(73) Assignee: KING.COM LTD., St. Julians (MT)

( * ) Notice: Subject to any disclaimer, the term of this patent is extended or adjusted under 35 U.S.C. 154(b) by 172 days.

(21) Appl. No.: 16/259,013

(22) Filed: Jan. 28, 2019

(65) Prior Publication Data

US 2020/0244771 A1 Jul. 30, 2020

(51) Int. Cl.
H04L 29/08 (2006.01)
G06F 9/54 (2006.01)
G06F 8/61 (2018.01)

(52) U.S. Cl.
CPC ............ H04L 67/34 (2013.01); G06F 8/61 (2013.01); G06F 9/542 (2013.01); H04L 67/303 (2013.01)

(58) Field of Classification Search
CPC ....... H04L 67/34; H04L 67/303; H04L 63/08; G06F 8/61; G06F 9/542
See application file for complete search history.

(56) References Cited

U.S. PATENT DOCUMENTS

| | | | | |
|---|---|---|---|---|
| 8,135,843 B2* | 3/2012 | Kramer | ................. | G06F 16/958 709/227 |
| 8,589,691 B1* | 11/2013 | Hackborn | ............... | G06F 21/51 713/176 |
| 8,838,970 B1* | 9/2014 | Suresh | ................... | G06F 21/32 713/168 |
| 9,110,750 B2* | 8/2015 | Somani | ................... | G06F 8/61 |
| 9,455,988 B2* | 9/2016 | Oberheide | ............. | G06F 21/31 |
| 9,489,524 B2* | 11/2016 | Wurster | ................. | G06F 21/52 |
| 9,578,015 B2* | 2/2017 | Xu | ........................ | H04L 63/10 |
| 9,645,914 B1* | 5/2017 | Zhang | ................ | G06F 11/3692 |
| 10,628,573 B2* | 4/2020 | Gibbs | .................... | H04W 4/33 |
| 2005/0114363 A1* | 5/2005 | Borthakur | ............... | G06F 16/10 |
| 2007/0130343 A1* | 6/2007 | Pardo-Blazquez | ........................ | H04L 61/1547 709/227 |
| 2008/0034363 A1* | 2/2008 | Jones | ....................... | G06F 8/60 717/174 |
| 2008/0188299 A1* | 8/2008 | Angell | ..................... | G07C 9/28 463/29 |
| 2008/0318686 A1* | 12/2008 | Crowder | ............. | G07F 17/3225 463/42 |
| 2009/0124383 A1* | 5/2009 | Gadda | ................... | G07F 17/322 463/36 |
| 2011/0010704 A1* | 1/2011 | Jeon | ........................ | G06F 8/61 717/178 |

(Continued)

Primary Examiner — Sargon N Nano
(74) Attorney, Agent, or Firm — Saul Ewing Arnstein & Lehr LLP

(57) ABSTRACT

A computer implemented method provided on a computer device comprises providing a web function running on a at least one processor to obtain a first identity from a first app. The web function transmits the first identity to a first server. A second app runs on the computer device and generates a series of events, at least one event comprising the first identity which are transmitted to for example, a streaming platform.

13 Claims, 11 Drawing Sheets

(56) References Cited

U.S. PATENT DOCUMENTS

| | | | |
|---|---|---|---|
| 2012/0052954 A1* | 3/2012 | Zhu | A63F 13/213 |
| | | | 463/42 |
| 2012/0233675 A1* | 9/2012 | Hird | H04L 63/0838 |
| | | | 726/6 |
| 2013/0079153 A1* | 3/2013 | Crowder, Jr. | G07F 17/32 |
| | | | 463/42 |
| 2013/0227432 A1* | 8/2013 | Lin | H04M 1/72451 |
| | | | 715/753 |
| 2015/0046287 A1* | 2/2015 | Libin | G06Q 30/0633 |
| | | | 705/26.61 |
| 2015/0149994 A1* | 5/2015 | Adachihara | A63F 13/30 |
| | | | 717/178 |
| 2017/0317827 A1* | 11/2017 | Woo | H04L 9/3231 |
| 2017/0374138 A1* | 12/2017 | Anwer | G06F 21/31 |
| 2019/0147441 A1* | 5/2019 | Li | G06Q 20/3276 |
| | | | 705/71 |
| 2019/0151764 A1* | 5/2019 | Chen | A63F 13/30 |
| 2019/0230164 A1* | 7/2019 | Jain | H04L 67/146 |
| 2020/0192787 A1* | 6/2020 | Cauley | G06F 11/368 |
| 2020/0229206 A1* | 7/2020 | Badic | H04W 72/12 |
| 2021/0158217 A1* | 5/2021 | Hong | G06N 20/00 |
| 2021/0176155 A1* | 6/2021 | Awad | H04L 43/18 |

* cited by examiner even pages.

COMPUTER IMPLEMENTED METHOD AND COMPUTER DEVICE

FIELD OF THE INVENTION

The present application relates to a computer implemented method and a computer device and in particular but not exclusively for determining which particular device has provided a given stream of events

BACKGROUND OF THE INVENTION

The advent of the internet, and other wide area networks, has led to a proliferation of connected user or client devices, typically running services and associated installations from providers of the user's choice. Such installations may be referred to as apps. There are many different examples of apps such as gaming apps, social apps, entertainment apps, music apps, navigation apps, health apps and many other types of apps.

One example of such apps may be gaming related.

One technical challenge relates to the scenario where an app is installed on a particular device and determining which events are generated by that app on that particular device. In particular, it is a technical challenge to extract the data which is required to make this determinations quickly and effectively.

This patent specification describes not only various ideas and functions, but also their creative expression. A portion of the disclosure of this patent document therefore contains material to which a claim for copyright is made and notice is hereby given: Copyright King.com Limited 2019 (pursuant to 17 U.S.C. 401). A claim to copyright protection is made to all screen shots, icons, look and feel and all other protectable expression associated with the games illustrated and described in this patent specification.

SUMMARY OF THE INVENTION

According to a first aspect, there is provided a computer implemented method provided on a computer device, the method comprising: providing by a first app running on at least one processor of the computer device a first identity; using a web function running on the at least one processor to obtain the first identity from the first app; transmitting the first identity obtained by the web function to a first server; providing by a second app running on the at least one processor a series of events, at least one event comprising the first identity; and transmitting the series of events.

The method may comprise transmitting the series of events to a streaming server.

The method may comprise: installing the first app and generating the first identity; and subsequently installing the second app and obtaining the first identity from the first app.

The method may comprise: installing the first app and checking if there is any other app installed on the device which has previously generated the first identity; and if so, using the previously generated first identity.

The method may comprise: installing the first app and checking if there is any other app installed on the device which has previously generated the first identity; and if not, generating the first identity.

The method may comprise: installing the second app and generating the first identity; and subsequently installing the first app and obtaining the first identity from the second app.

The method may comprise: installing the second app and checking if the first app is installed on the device which has previously generated the first identity; and if so, using the previously generated first identity.

The method may comprise installing the second app and checking if the first app is installed on the device and has previously generated the first identity; and if not, generating the first identity.

The first identity may be unique to the computer device.

The events may comprise a second identity, at least one of the events comprising the first identity and the second identity.

The method may comprise receiving at a streaming platform the series of events as part of a stream of events comprising events from a plurality of devices.

The method may comprise filtering the stream of events using the first identifier to determine a second identifier and filtering the stream of events to provide the series of events.

According to another aspect, there is provided a computer device comprising: at least one processor and at least one memory including computer program code, the at least one memory and the computer program code configured to, with the at least one processor, cause the computer device at least to: provide by a first app a first identity; use a web function to obtain the first identity from the first app; cause the first identity obtained by the web function to be transmitted to a first server; provide by a second app a series of events, at least one event comprising the first identity; and cause the series of events to be transmitted.

The at least one memory and the computer code may be configured, with the at least one processor, to cause the computer device to cause the series of events to be transmitted a streaming server.

The at least one memory and the computer code may be configured, with the at least one processor, to cause the computer device to install the first app and generate the first identity and subsequently install the second app and obtain the first identity from the first app.

The at least one memory and the computer code may be configured, with the at least one processor, to cause the computer device to install the first app and check if there is any other app installed on the device which has previously generated the first identity and if so, use the previously generated first identity.

The at least one memory and the computer code may be configured, with the at least one processor, to cause the computer device to install the first app and check if there is any other app installed on the computer device which has previously generated the first identity; and if not, generate the first identity.

The at least one memory and the computer code may be configured, with the at least one processor, to cause the computer device to install the second app and generate the first identity and subsequently install the first app and obtain the first identity from the second app.

The at least one memory and the computer code may be configured, with the at least one processor, to cause the computer device to install the second app and check if the first app is installed on the device which has previously generated the first identity and if so, use the previously generated first identity.

The at least one memory and the computer code may be configured, with the at least one processor, to cause the computer device to install the second app and check if the first app is installed on the device and has previously generated the first identity and if not, generate the first identity.

The first identity may be unique to the computer device.

The events may comprise a second identity, at least one of the events comprising the first identity and the second identity.

A system may be provided which comprises the computer device and a streaming platform. The streaming platform may be provided by any suitable hardware such as a server. The streaming platform may be configured to receive the series of events as part of a stream of events comprising events from a plurality of computer devices.

The system may comprise hardware for filtering the stream of events using the first identifier to determine a second identifier and filtering the stream of events to provide the series of events. The hardware may be provided by processing hardware.

According to some aspects, there is provided a program product comprising a computer-readable storage device including a computer-readable program for providing a computer-implemented game, wherein the computer-readable program when executed on a computer causes the computer to perform any one or more of the method steps described previously.

According to another aspect, there is provided a computer readable non-transitory storage medium carrying one or more computer executable instructions which when run on at least one processor cause:

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

BRIEF DESCRIPTION OF DRAWINGS

To understand some embodiments, reference will now be made by way of example only to the accompanying drawings, in which.

DETAILED DESCRIPTION OF SOME EMBODIMENTS

The terms user and player are used interchangeably throughout this document and no specific meaning is intended using one or the other unless the context suggests otherwise.

In the following description of various embodiment, reference is made to the accompanying drawings which form part thereof, and in which is shown by way of illustration various implementations in which some embodiments may be utilized. It is to be understood that the other implementations may be utilized, and structural and functional modifications may be made without departing form the scope of the present invention.

Figure 1:
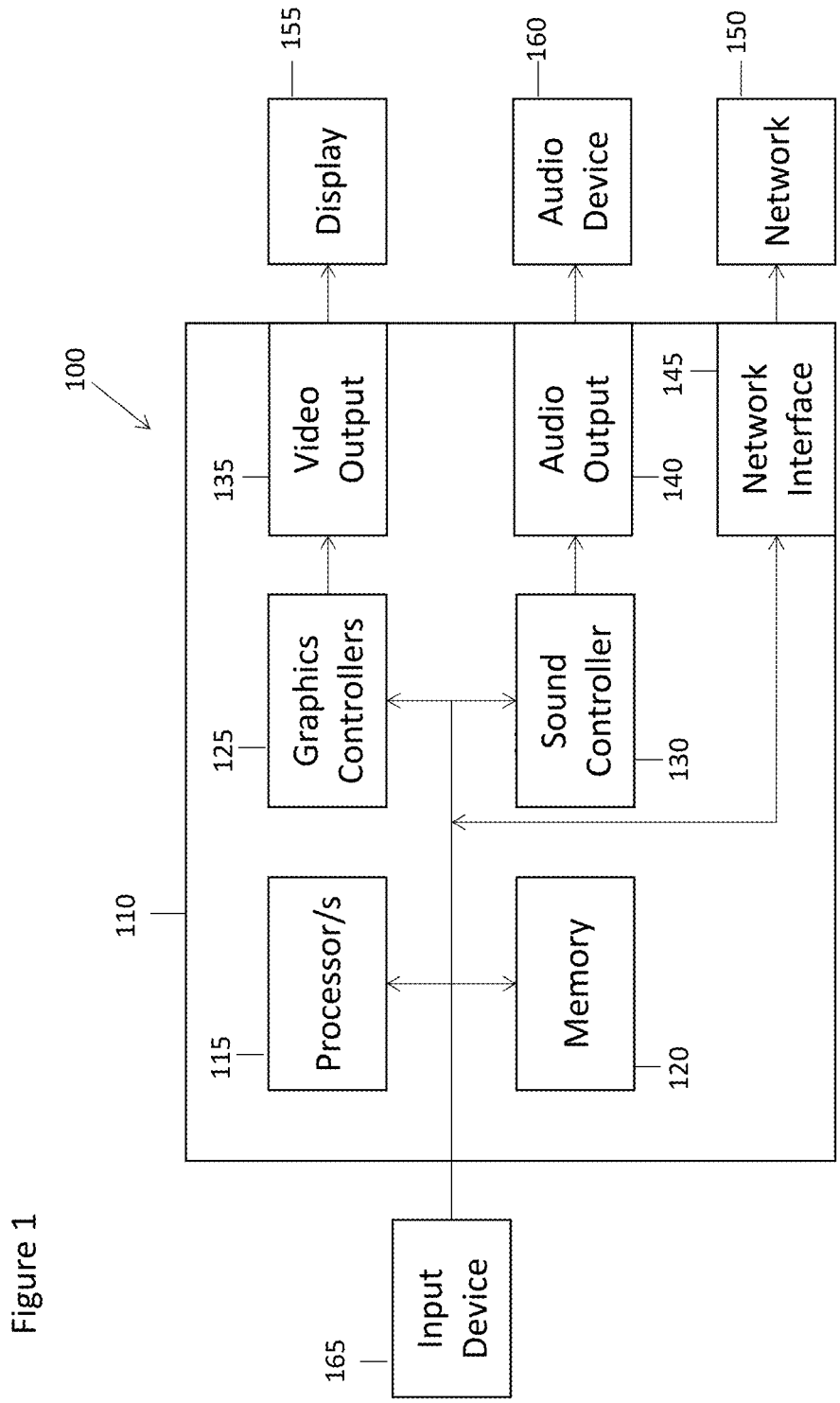
FIG. 1 shows an example client or user device.

A schematic view of a user device 100 according to an embodiment is shown in FIG. 1. All of the blocks shown are implemented by suitable circuitry. The blocks may be implemented in hardware and/or software. The user device may have a control part 110 which may be provided by one or more processors 115 and at least one memory 120. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network 150 such as the Internet or other communication infrastructure.

The video output 135 is provided to a display 155. The audio out 140 is provided to an audio device 160 such as a speaker and or earphone(s).

The device 100 has an input device 165. The input device can take any suitable format and can be one or more of a keyboard, mouse, touch screen, joystick or game controller. It should be appreciated that the display 155 may in some embodiments also provide the input device 165 by way of an integrated touch screen for example.

The blocks of the controller 110 are configured to communicate with each other by an interconnect such as a bus or any other suitable interconnect and/or by point to point communication.

It should be appreciated that in some embodiments, the controller may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

In some embodiments, an app may be installed and run on the controller 110.

Figure 2:
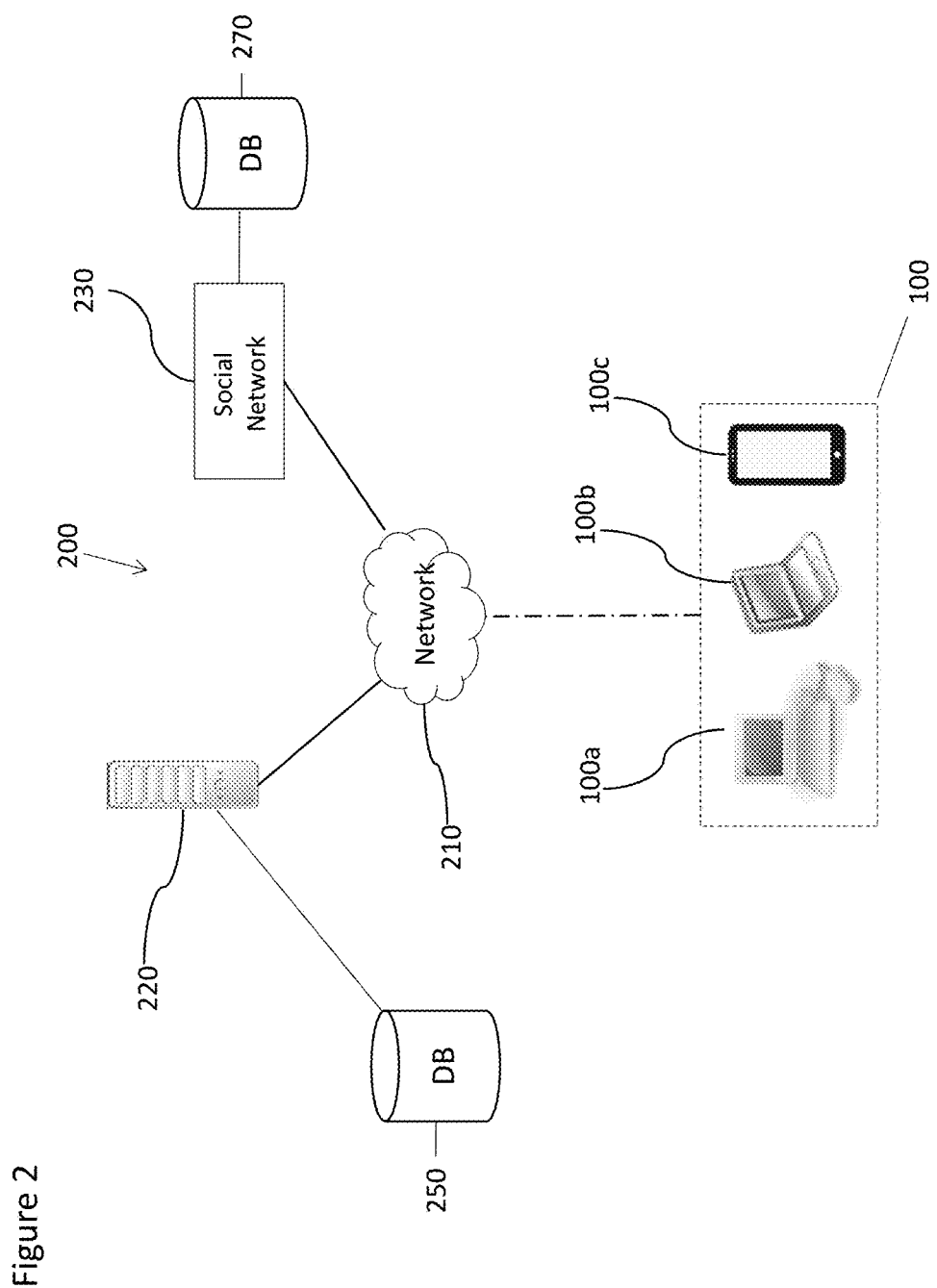
FIG. 2 illustrates a networked computer system.

FIG. 2 schematically shows a system 200 which is provided when the user device is in normal use. In this example, the app may be a game. However, it should be appreciated that this is by way of example only and a similar or the same system may alternatively or additionally be provided to support one or more other apps running on the user device.

The system 200 comprises a server 220 which may store or be in communication with database 250. In the case where the app is a game, this database may store game player's details, profiles, statistics etc. In practice, one or more databases 250 may be provided.

Where more than one server 220 is provided, the database(s) 250 may be provided in one server 220 or across two or more servers.

The server 220 may also have a games data function and/or other app function. This may comprise one or more units of memory to store the computer game program, user behaviour data and a processor to run the games program and process the user behaviour data.

The server 220 may communicate via, for instance, the internet 210 to one or more client or user devices 100, shown in FIG. 2 by way of example as user devices 100a, 100b and 100c, and may further provide connections to a social network 230, for example, Facebook™. The social network 230 may also be connected to a database 270 storing social user interaction details, for instance, user to user interaction maps, friend lists, location history etc. In practice, one or more databases 270 may be provided.

It should be appreciated that embodiments may be deployed in different system architectures. For example, the computer game may be implemented as a computer game that is stored in the memory of the user device and is run on the processor of the user device. However, the server 220 may handle some elements of the game in some embodiments. By way of example only, a Java game applet may be provided to the user device 100 and the locally running Java applet will generate, for example, the graphics, sounds, and user interaction for the game play on the user device. Some data may be fed back to the server to allow interaction with other players. The data which is fed back may alternatively or additionally allow scoring and/or cross platform synchronization.

The game or app can be implemented allowing a user to interact with it in different ways depending on the capabilities of the device which the user is accessing the game with. A user can interact with the game or app through using a touch screen.

Over the course of players playing the game or interacting with the app, data will be produced. This data can for instance be related to a player's game performance or to game information related to a social network.

It is possible to gather this data, store it and make use of it for instance to improve the game.

Some embodiments may be applied in testing scenarios. However other embodiments may be applied in other scenarios where it is desired to determine the stream of events from a particular app on a particular device.

Figure 3:
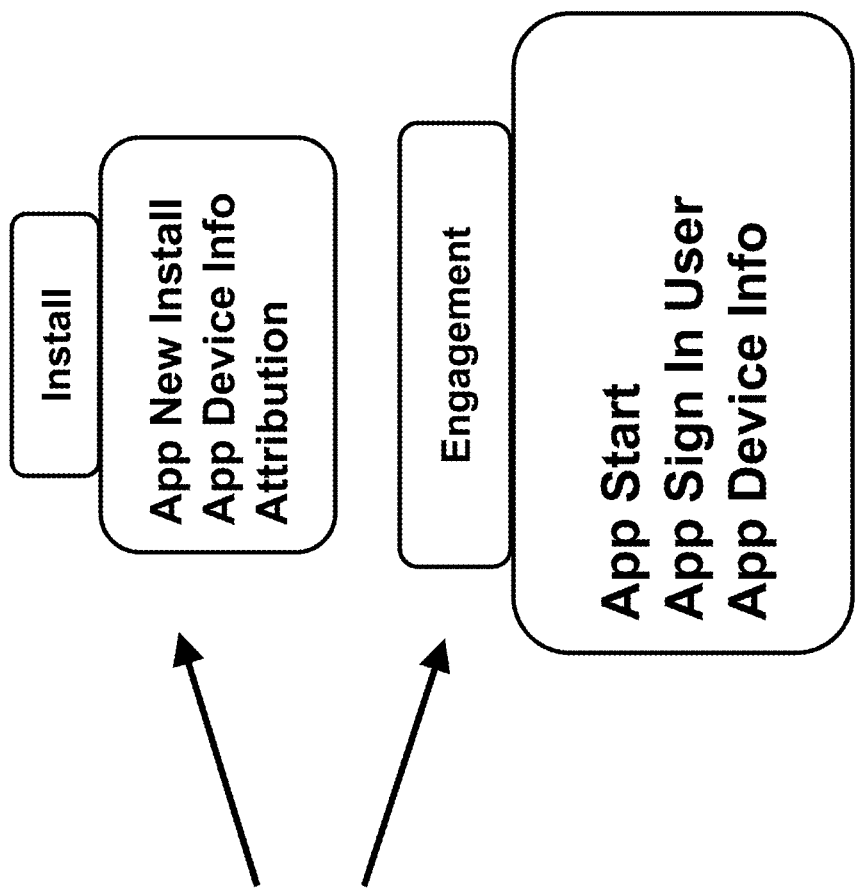
FIG. 3 schematically illustrates two phases of an app testing process.

Reference is made to the FIG. 3 which schematically illustrates the process for testing an app. In some embodiments, depending on the aspect of the app being tested, the testing process may be considered to have two phases. In the first phase, the app being tested may be installed on a user device and the correct installation of the app is tested. The second phase of the test may be to start the app and ensure that the app functions as required. One or other of these phases may be omitted in some embodiments. In some embodiments, there may be one or more further test phases. In this scenario, one or both of the first and second phases may be omitted.

The installation of the app to be tested may generate events. By way of example, these events may be one or more of a new app install event, an app device information event and an attribution install event. The attribution install event provides information as to the source of the install or where the install originated from. The app device information event may provide the information about the device on which the app is installed. This information may provide information about the characteristics and/or capabilities of the device itself.

It should be appreciated that in some embodiments, one or more of these install related events may be omitted. In other embodiments, alternatively or additionally, one or more other events may be generated.

The starting of the app may generate events. The events associated with the starting of the app may be considered to be engagement type events. By way of example, these events may be one or more of an app start event, a user signing into the app event, an app device information event and/or any other suitable event. The app device information event may provide information about the device on which the app is installed.

It should be appreciated that in some embodiments, one or more of these engagement related events may be omitted. In other embodiments, alternatively or additionally, one or more other events may be generated.

An example event is as follows:

| 10005 | AppStart | coreUserId (long) |
|---|---|---|

The first field provides an event number, the second field describes the event that has occurred (app start in this example), and the third field defines the user identity. Other embodiments, may provide one or more additional and/or alternative fields.

In some embodiments, an app provider may provide a plurality of different apps and/or allow their apps to be provided on a plurality of different devices of a same user. Accordingly, the app provider may assign a common identity to the user for all of the different apps on a given device and/or for one or more apps being used on different devices.

Figure 4:
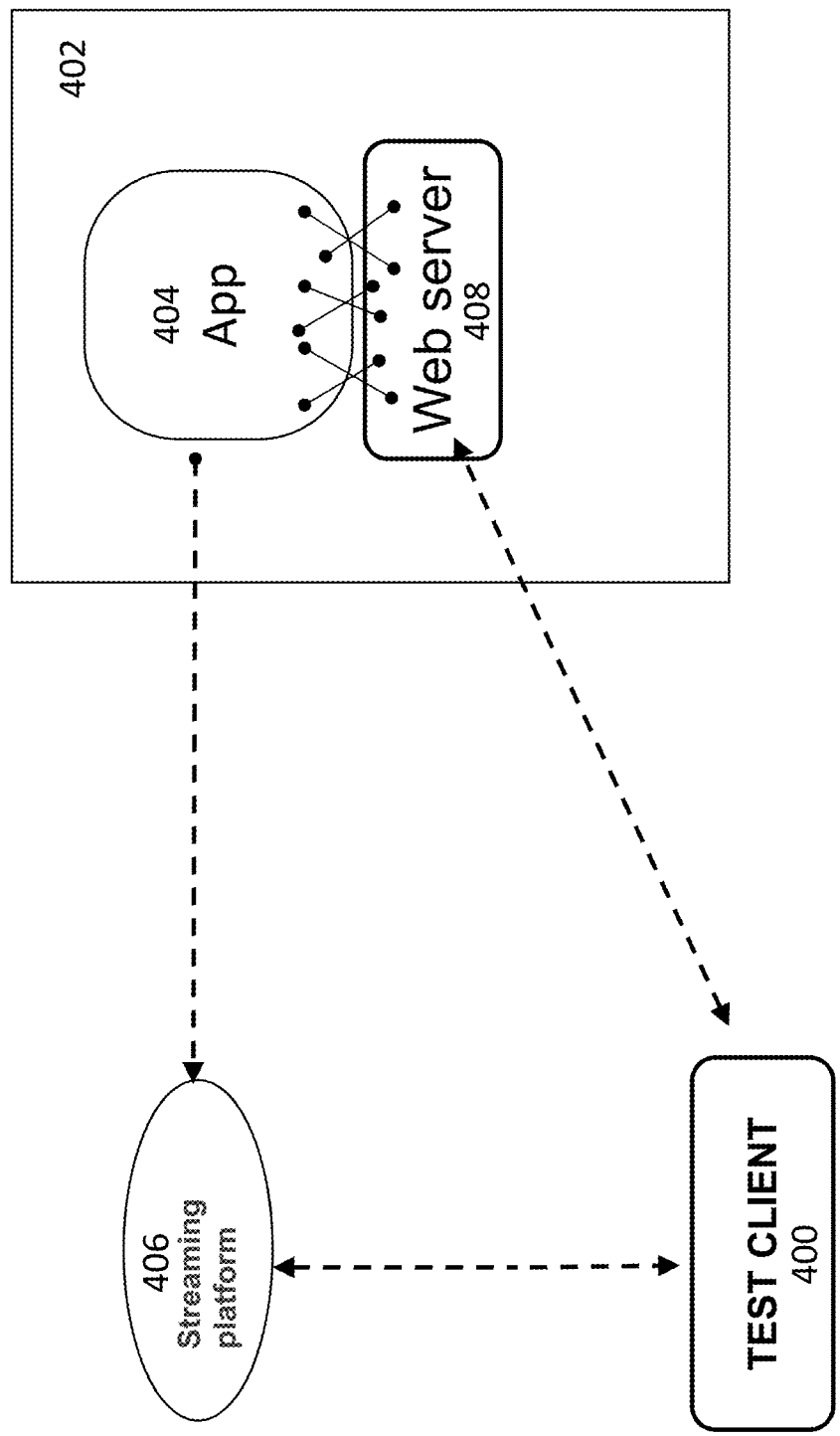
FIG. 4 schematically shows a system for testing an app.

FIG. 4 shows schematically one known arrangement for testing of an app. In this in example, there is a test client 400 which is configured to communicate with a stream processing platform 406. This streaming platform may be an Apache Kafka stream processing platform. It should be appreciated that different stream processing platforms may alternatively be used. The stream processing platform may be able to have the aim of having a relatively high throughput and relatively low latency platform for handling real-time data feeds.

The app 404 which is to be tested is installed on a user device 402. This device may be as described in relation to FIG. 1. A web server function 408 is provided. The web server function may expose REST endpoints that gives the test client access to internal app states. Representational state transfer REST is typically used in web applications. In other embodiments, a non REST implementation may be used.

This web server function is provided as part of the test and implements hooks into the app under test in order to do automated tests. In the example shown in FIG. 4, the test client may send a request to the web server function 408 requesting that user ID. In response the web server function 408 is configured to obtain the user ID from the app. The user ID may be a social network agnostic identity. The web server 408 is configured to provide the user ID to the test client 400.

The app generates and output events which are provided to the stream processing platform 406. These event can be analysed in order to determine if the testing has been successful or not. The analysis may be used to determine one or more problems with the app which is being tested.

The test client 400 and the streaming platform 406 are configured to communicate to thereby provide event verification. Using the user ID which the test client receives, the events which are output by the app installed on particular device can be determined. Accordingly, these events which are output can be associated with a particular version of the app under the test as well as the specific device being tested.

The arrangement shown in FIG. 4 may suffer from the disadvantage in that every time an app needs to be tested, an associated web server function needs to be integrated into the app being tested in order to provide the required hooks into the application being tested. This provides several technical challenges. This may be time consuming and slow down the testing cycles. Integrating this associated web server function may introduce some complexity into the process and itself may introduce errors. The integration of a webserver function is problematic where third party apps or the like are being tested.

Figure 5A:
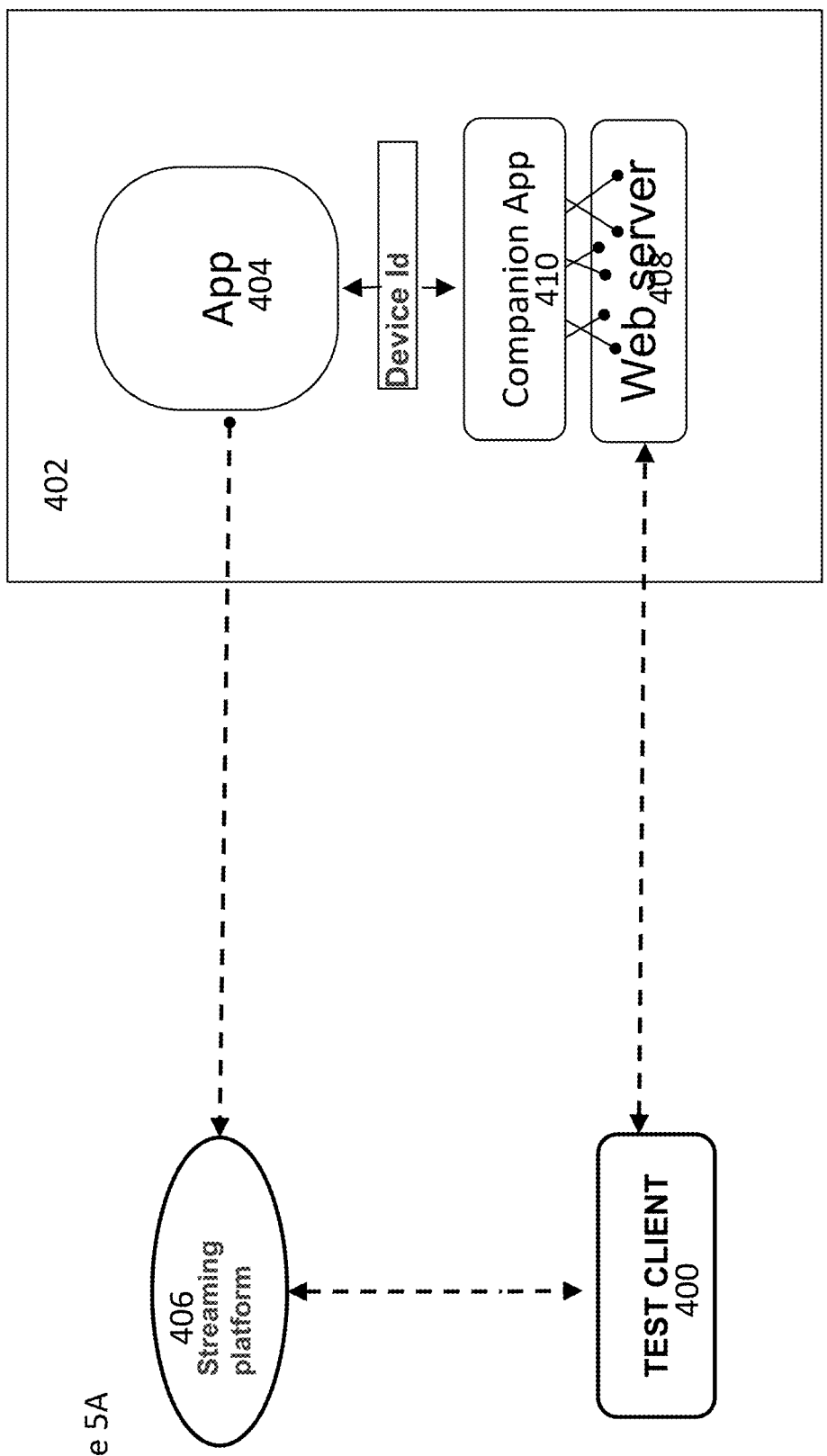
FIG. 5A schematically shows a system according to some embodiments for testing an app.
Figure 5B:
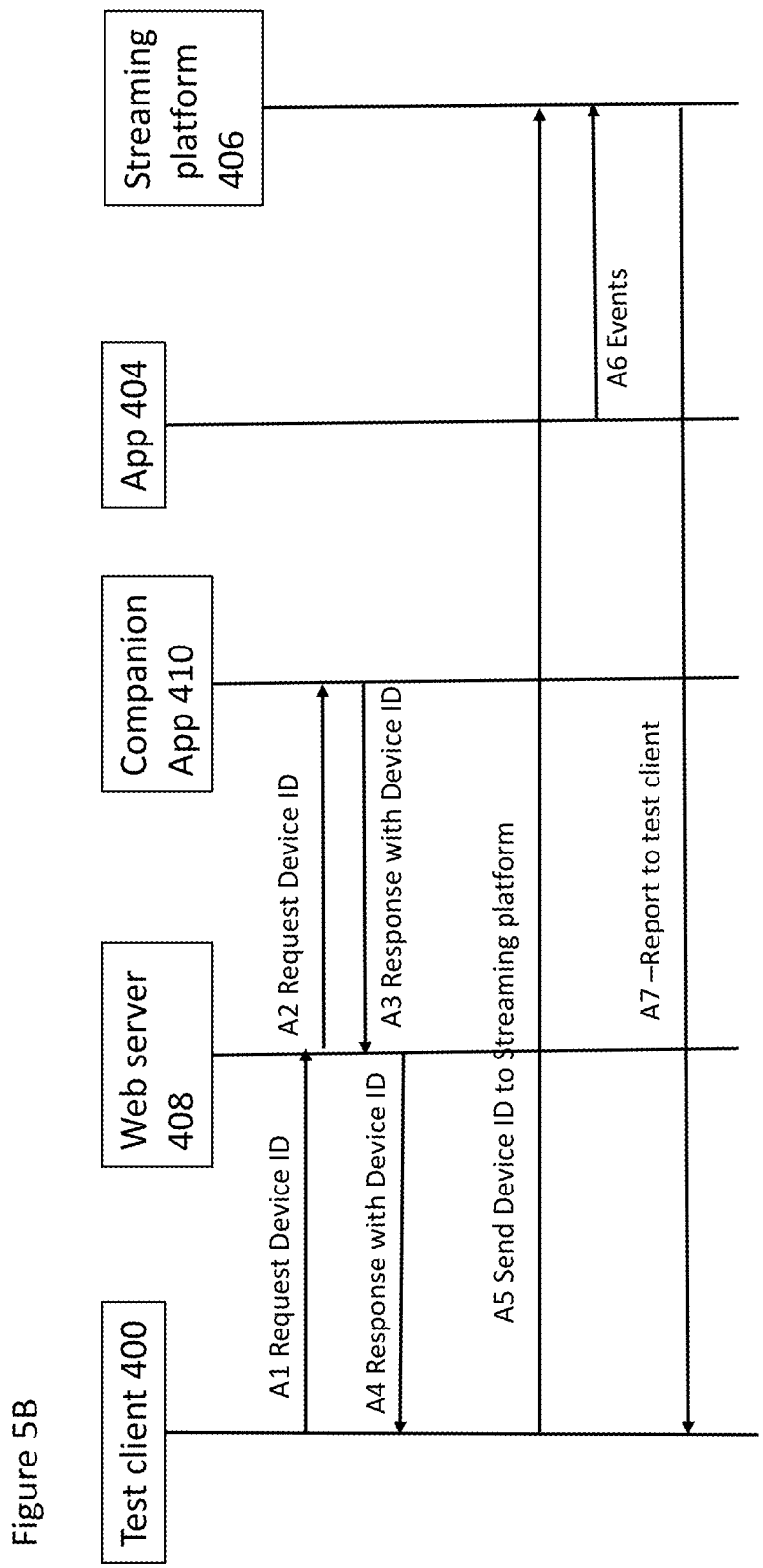
FIG. 5B shows an example of signaling for the system of FIG. 5A.

Reference is made to FIGS. 5A and 5B which show an embodiment. Those parts which are the same as described in relation to FIG. 4 are referenced by the same references. In this embodiment, there is a test client 400 as well as the stream processing platform 406. The app 404 is installed on the device 402. In this embodiment, a companion app 410 is provided. This companion app 410 can be used with any of the apps under test and does not need to be specifically adapted to any of the apps which are being tested.

In some embodiments, when a new app is installed on a device, that app may be configured to check if there are any other apps already installed on that device from for example the same app provider. This is so that a common ID may be associated with that particular device and can be used for all of the apps installed on the same device from that particular provider. In some embodiments, the companion app 410 is installed on the device. When the app 404 to be tested is installed on the device, the companion app 410 and the app 404 under test will communicate. Both the app 404 under test and the companion app 410 will both use a common device ID. This may be unique for that particular device.

In some embodiments, the ID may be a device ID. In other embodiments, alternatively or additionally any other suitable ID may be used. The ID may be a user related ID in some embodiments.

In some embodiments, a companion app is an app which is provided to accompany one or more other apps which are to be installed on the device. The companion app may have the function to ensure that the one or more apps interact with a server back using common identity information. The server back end will thus see a common device ID for the device and/or a common user related ID. It should be appreciated that the common device ID may be generated by the companion app and/or by the first server.

In some embodiments, the companion app may be first installed on the device. The companion app is configured to check to see if there are any other apps on the device which are from the common provider. Where the companion app is the first app to be installed, the companion app is configured to generate a device ID. When a further app is installed on the device from the common provider, the further app checks for any related apps. The further app determines that the companion app is provided and will use the device ID which was generated by the companion app.

If on the other hand, the companion app was not the first app from the common provider to be installed on the device, the companion app will instead use the device ID which has been already generated by the already installed app.

The web server function 408 thus provides a simple function and is configured to obtain the device ID from the companion app 410. As the same companion app is used for any of the apps which are under test, the web server function 408 can be standardised. In some embodiments, this means that the web server function does not need to be modified for every new app or app modification which is being tested. In some embodiments, the need to integrate a web server into the app under test may be avoided.

Thus, the device ID obtained by the web server 408 is provided to the test client 400.

When the test is run, the app 408 will generates the events which are provided to the stream processing platform 406. In some embodiments, the stream processing platform may be receiving a relatively large quantity of events from a large number of apps running on respective devices. In some embodiments, the streaming platform is used for receiving events from live apps as well as apps which are under test. Accordingly, identifying which events are from a test app installed on a particular device may be complex.

It should be appreciated that in some embodiments, the app itself may be tested and/or the functioning of the app on a particular device operating in accordance with a particular operating system, for example, may be tested. For example, it may be checked that the app works with Android and Apple operating systems and/or that the app works with devices provided by different manufacturers.

The stream processing platform 406 and the test client 400 communicate. The stream processing platform is able to map the device ID and/or other ID to a user ID and/or other ID which is used in the generated events. This allows the events from the app which is being tested on a particular device to be analysed. In other words, it is known which events are from which device having which version of the test app installed.

In particular, the app under test will generate a series of events. All the events generated by the app under test on a particular device will have either a single unique ID or a plurality of IDs which allow the app under test on the particular device to be determined. It should be appreciated that one or more different further identifiers may be generated. For example, an install identifier may be provided. In embodiments, at least one event will be provided which includes the common device ID.

Once the event with common device ID or the like is received, this allows the common device ID to be associated with one or more other IDs associated with the device. This is used to filter the stream of events to obtain the events generated by the app under test on a particular device. It should be appreciated that this may allow one or more further identities associated with the app under test on a particular device to be determined. This filtering and association of one or more further identities may be repeated if required in some embodiments. In some embodiments, once the common device identity has been associated with the identity used in the events generated by the app under test on the particular device, this may allow all of the events generated by the app under test on a particular device to be provided.

A series of events are expected outcomes of the running of the test app. If one or more of these expected series of events are not received, this may be indicative of a problem with the app under test. In some embodiments, the order of the series of events may be considered when determining if the app under test is performing correctly. Alternatively or additionally, in some embodiments, the test may be such that a single event may be considered at a time.

Reference is made to FIG. 5B which shows one example of a signalling flow.

In step A1, a request is sent from the test client to the web server function 408 requesting a first ID which may be a device ID and/or any other suitable ID.

In step A2, a request is sent from the web server function 408 to the companion app 410 requesting the first ID.

In step A3, a response with the first ID is provided from the companion app 410 to the web server 408.

In step A4, a response with the first ID is provided from web server 408 to the test client.

In step A5, the first ID is sent from the test client to the streaming platform 406.

In step A6, a stream of events is sent from the app 404 and the streaming platform.

Step A6 may take place before step A5.

In step A7, the streaming platform is configured to report to the test client. As will be described in more detail previously the events which are associated with app under test can be identified and analysed. This analysis can be used to indicate, for example, an outcome of the test or the like. In some embodiments, this analysis may be performed by any suitable entity.

The streaming platform may provide the filtered stream of event to another entity such as a computer device for analysis of the test. The results may be provided by that further device.

In some embodiments, the results of the analysis of the test may be provided to a different entity to the test client. The different entity may be a computer device or the like. In some embodiments, the stream of filtered events may be provided to the test client which is configured to analyse the stream of events from the app under test.

In some embodiments, a further entity may receive the device ID from the test client and events from the streaming platform.

It should be appreciated that this method is by way of example only. In some embodiments, the first ID may be pushed out to the test client, avoiding the need for steps A1 and A2.

Figure 6:
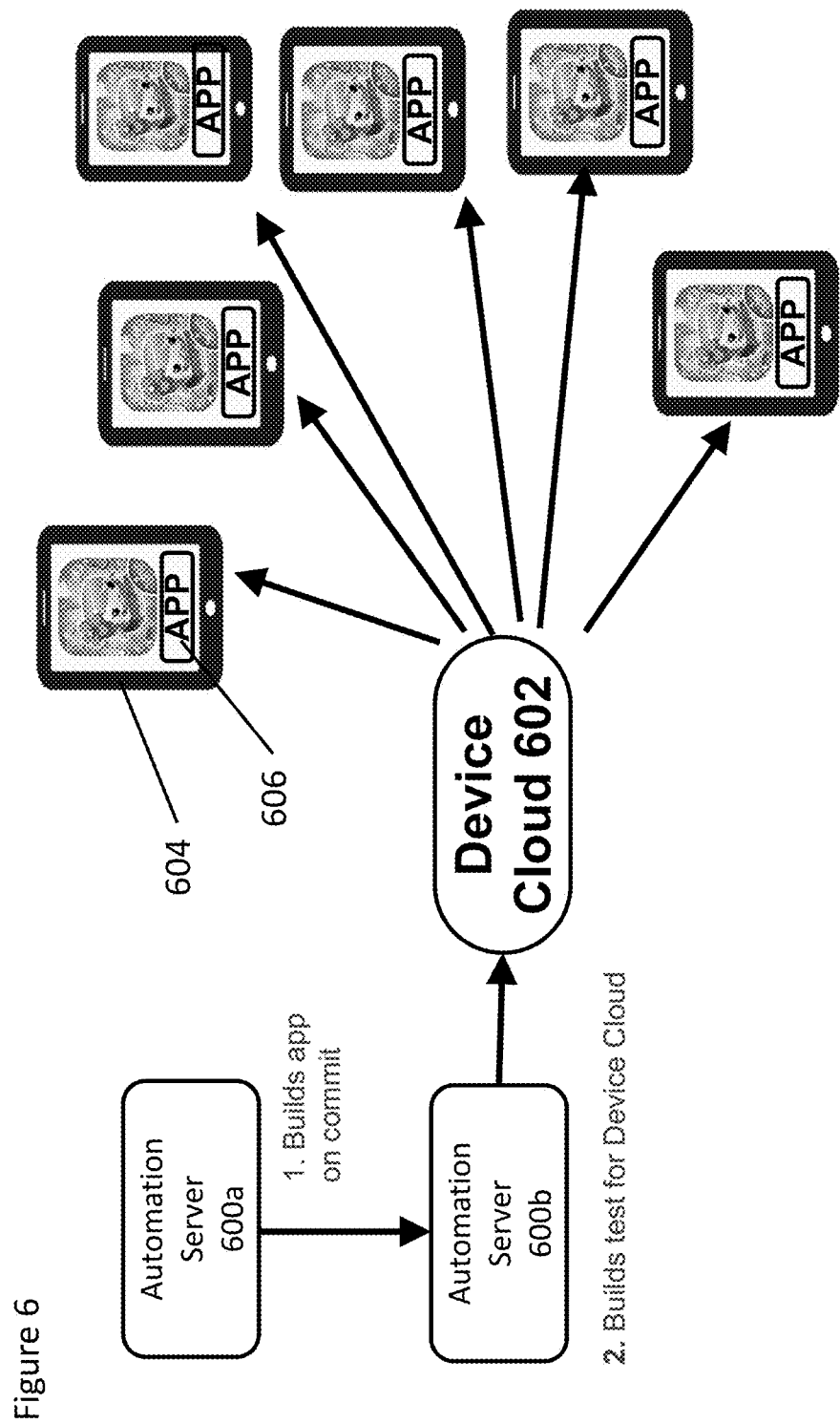
FIG. 6 schematically shows testing of an app on different devices.

Reference is made to FIG. 6 which shows an example of a test environment. In this example, there is a first test server 600a and a second test server 600b. In some embodiments, test server 600a and test server 600b may be the same server or part of the same group of servers.

Some embodiments may use a Jenkins server. Jenkins is an automation server. In other embodiments, any other suitable automation server may be used.

The Jenkins server or other server 600a is configured to build the app on commit.

The test app is provided by the automation server to the device cloud 600 which distributes the app 606 to be tested to various devices 604. Each device may operate such as described in relation to FIGS. 5A and 5B. The test may be built by the automation server which may define what is to be tested and/or which devices are to be used in the test.

Figure 7:
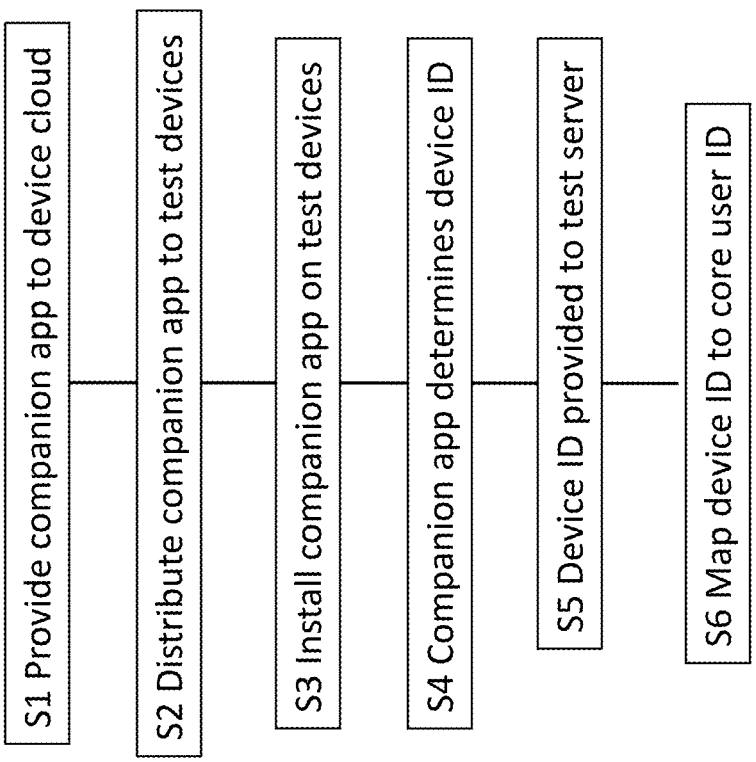
FIG. 7 shows a method some embodiments in which a companion app is installed.

Reference is made to FIG. 7 which shows a method of some embodiments.

In step S1, a companion app is provided to a device cloud.

In some embodiments, the companion app may be installed as part of the test process or prior to the downloading of the test app. In step S2 the companion app is distributed to the test devices. This may be via the device cloud. In some embodiments, the companion app may be provided initially and subsequent tests may use the previously installed companion app.

In step S3, the companion app is installed on the test devices.

In step S4, the companion app determines or looks up or otherwise determines the device ID for the device. This may be triggered by the app being tested or by the test process.

In step S5, the device ID is transmitted by the device to the test client.

In step S6, the test client and/or the stream processing platform is configured to map the device ID to the user ID.

The set of events associated with the app being tested on a particular device can be determined.

Figure 8:
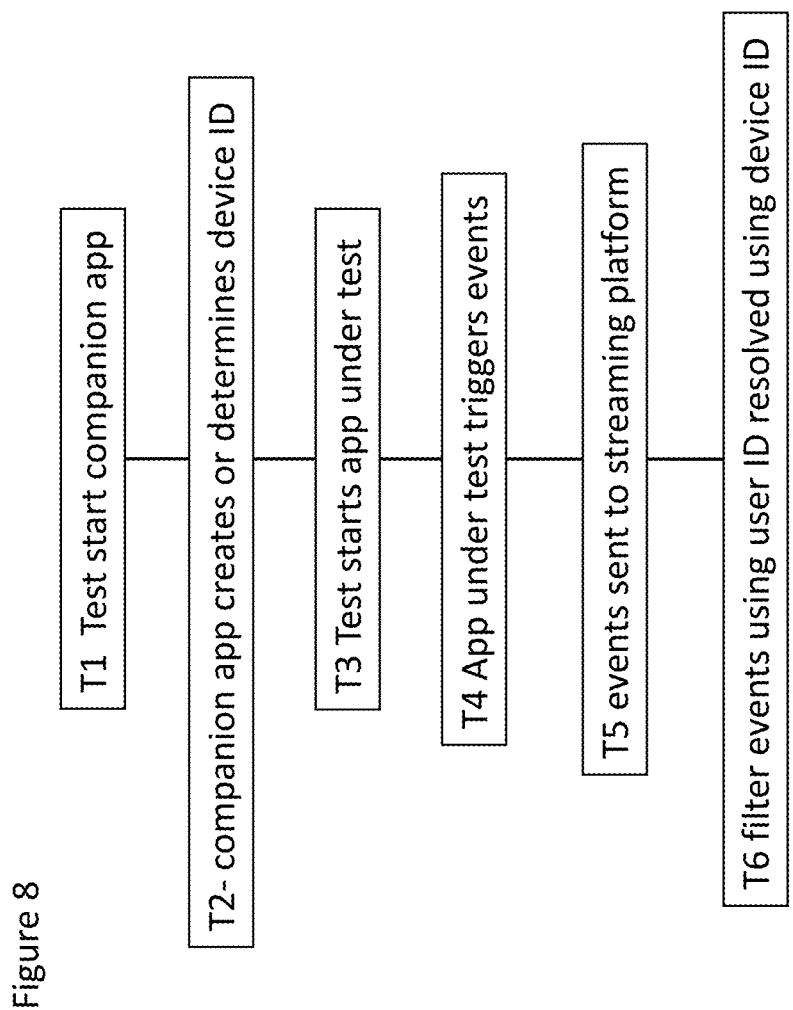
FIG. 8 shows a method of some embodiments in which an app is tested.

References made to FIG. 8 which shows another method of some embodiments.

In step T1, the test starts the companion app.

In step T2, the companion app creates or determines a first ID. The first ID may be a device ID or any other suitable ID.

In step T3, the test will start the app under test.

In step T4, the app under test will trigger the generation of events. The events may use a second ID. The second ID may be a user ID or any other suitable ID. In step T5, the events are sent from the device being tested to the streaming platform.

In the step T6, the events are filtered using the second ID resolved using the first ID. It should be appreciated that in some embodiments, there may be a plurality of different IDs which are used. Any one or more of these IDs may be used to filter the events. In some embodiments, step T6 may be optional.

Figure 9:
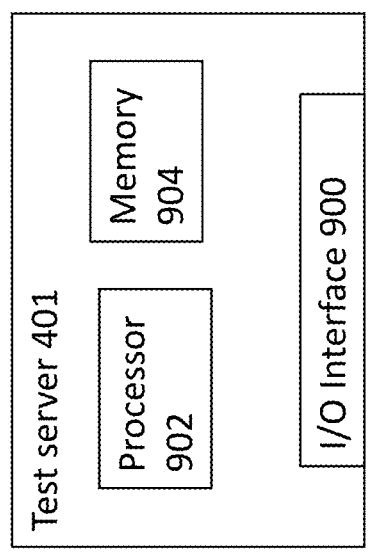
FIG. 9 schematically shows a server of some embodiments.

Reference is made to FIG. 9 which shows an example of the structure of a test server on which the test client 400 is installed. The test server has at least one processor 902 and at least one memory 904. The memory may be any suitable memory and may for example comprise a database. An input/output interface is provided to receive data and to output data. The components of the test server may communicate via a communications bus.

Figure 10:
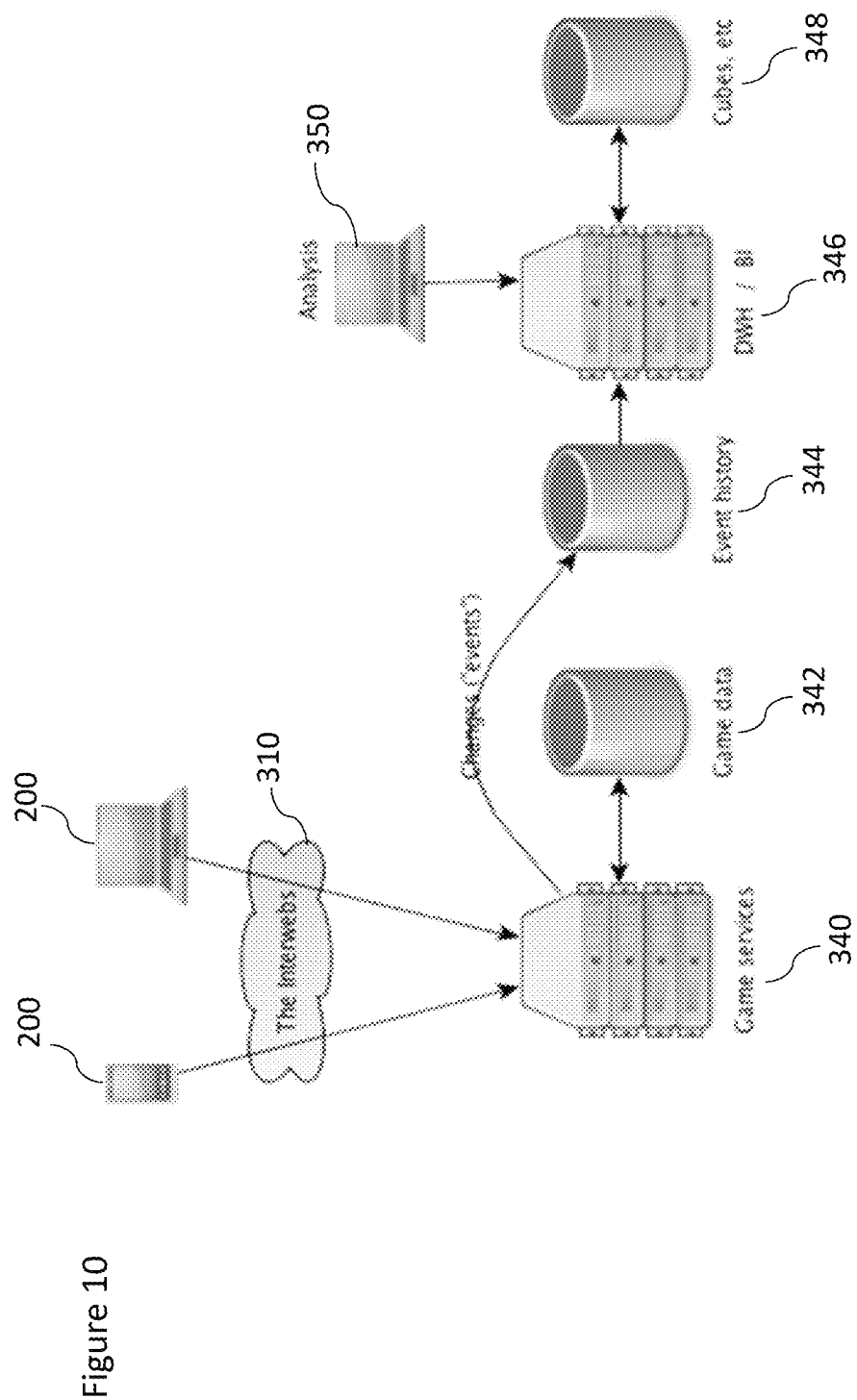
FIG. 10 shows an example of a backend architecture.

Reference is now made to FIG. 10 which shows a backend architecture. This architecture again has an arrangement where events may be stored, for example in a data warehouse. The data which is stored in the data warehouse can be analysed using analysis tools 350. User devices 200 such as described in relation to FIG. 1 are provided. The user devices 200 communicate with servers 340 via the internet 310 or other suitable network. The game servers 340 may be any suitable servers. The servers provide services. The servers may listen to requests or tracking calls from the clients on the user devices.

One or more data servers 342 are arranged to store the user progress and other associated states.

The incoming events are stored in a database cluster 344, and may also be written to files in a data warehouse and business infrastructure 346. The data warehouse and business infrastructure may be a distributed file system. Each event or at least some events are mapped to a table. The table may be provided in a data cube 348. The use of tables may make it simpler to compute aggregates over the data and/or do more complex batch analysis.

This stream processing platform may be used for stream analytics. The platform may be implemented by computer executable code running on one or more processors. The one or more processors may be provided in one or more servers and/or one or more computing devices. This may be run on for example the data which is generated by the servers. Of course, in other embodiments, the data which is generated or provided will depend of the functionality supported.

These events may be analysed in real time or after they have been received. The events may be provided in one or more streams. Data from a single stream or data from two or more streams may be used.

The user device of FIGS. 5A and 5B may be one of the computing devices 200 of FIG. 10 in some embodiments. The streaming platform of FIGS. 5A and 5B may be provided by either one or both of the one or more game servers 340 and the one or more data servers 342 of FIG. 10 in some embodiments.

In alternative embodiments, the device may have a unique identity. The companion app will provide this unique device ID to the web server. Likewise the app which is to be tested will provide this unique device ID in one or more of the events which are generated.

In some embodiments, the companion app may access stored information and use the stored information to generate the unique device ID. The app under test may access the same stored information or separately have the same information and use this information to generate the unique device ID. The information may be an algorithm and/or numeric values and/or the like.

In some embodiments, a plurality of different apps to be tested may be installed on the device. There may be a companion app for each of these different apps. In such scenarios, different app identifiers may be used to distinguish the events from the different apps installed on the device. In this example, the same device id may be used.

In other embodiments, a separate companion app may be provided for each app which is being tested.

Various methods and devices have been described. It should be appreciated that these methods may be implemented in apparatus or devices comprising any suitable circuitry. Some embodiments may be implemented by at least one memory and at least one processor. The memory is provided by memory circuitry and the processor is provided by processor circuitry. Some embodiments may be provided by a computer program running on the at least one processor. The computer program may comprise computer implemented instructions which are stored in the at least one memory and which may be run on the at least one processor. A computer program product may be provided which comprises computer program product comprising code embodied on a computer-readable medium which is configured to be executed on a processor of the computer or user device. In some embodiments, a non-transitory computer readable storage device may be provided to store program code instructions that, when executed by at least one processor causes any of the above described methods to be performed.

A person skilled in the art will realise that the different approaches to implementing the game is not exhaustive, what is described herein are certain preferred embodiments. It is possible to implement the way in a number of variations without departing from the scope of the invention as claimed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer implemented method provided on a computer device, the method comprising:
    installing a first app which runs on at least one processor of the computer device, and generating a first identity;
    using a web function running on the at least one processor to obtain the first identity from the first app;
    transmitting, by the computer device, the first identity obtained by the web function to a test server;
    subsequently installing a second app which runs on the at least one processor and which is being tested, and obtaining the first identify from the first app;
    providing, by the second app, data relating to a series of events, wherein the data relating to at least one event comprises the first identity; and
    transmitting, by the computer device, the data relating to the series of events, the data relating to the series of events being provided to the test server.

2. The method of claim 1, wherein the first identity is unique to the computer device.

3. The method of claim 1, wherein the events are provided with a second identity, at least one of the events comprising the first identity and the second identity.

4. The method of claim 1, comprising receiving at a streaming platform the series of events as part of a stream of events comprising events from a plurality of devices.

5. The method of claim 4, comprising filtering the stream of events using the first identifier to determine a second identifier and filtering the stream of events to provide the series of events.

6. The method as claimed in claim 1, comprising receiving a request for the first identity from the test server and in response transmitting the first identity to the test server.

7. A computer device comprising:
    at least one processor and at least one memory including computer program code, the at least one memory and the computer program code configured to, with the at least one processor, cause the computer device at least to:
    install a first app;
    generating by the first app a first identity;
    use a web function to obtain the first identity from the first app;
    cause the first identity obtained by the web function to be transmitted to a test server;
    subsequently install a second app and obtain the first identity from the first app;
    provide, by the second app which is being tested, data relating to a series of events, wherein the data relating to at least one event comprises the first identity; and
    cause the data relating to the series of events to be provided to the test server.

8. The computer device of claim 7, wherein the first identity is unique to the computer device.

9. The computer device of claim 7, wherein the events are provided with a second identity, at least one of the events comprising the first identity and the second identity.

10. The computer device of claim 7, wherein the at least one memory and the computer program code are configured to, with the at least one processor, cause the computer device to receive at the streaming platform the series of events as part of a stream of events comprising events from a plurality of devices.

11. The computer device of claim 10, wherein the at least one memory and the computer program code are configured to, with the at least one processor, cause the computer device to filter the stream of events using the first identifier to determine a second identifier and filtering the stream of events to provide the series of events.

12. The computer device of claim 7, wherein the at least one memory and the computer program code are configured to, with the at least one processor, cause the computer device to receive a request for the first identity from the test server and in response transmitting the first identity to the test server.

13. A non-transitory computer readable medium comprising computer executable instructions, which when run by at least one processor of a computer device is configured to:
    install a first app;
    generating by the first app a first identity;
    use a web function to obtain the first identity from the first app;

cause the first identity obtained by the web function to be transmitted to a test server;
subsequently install a second app and obtain the first identity from the first app;
provide, by the second app which is being tested, data relating to a series of events, wherein the data relating to at least one event comprises the first identity; and
cause the data relating to the series of events to be provided to the test server.

\* \* \* \* \*